(12) United States Patent
Bird (10) Patent No.: US 8,881,137 B2
(45) Date of Patent: *Nov. 4, 2014

(54) CREATING A RELATIVELY UNIQUE ENVIRONMENT FOR COMPUTING PLATFORMS

(75) Inventor: Peter L. Bird, Ann Arbor, MI (US)

(73) Assignee: Speciation Limited, Englewood, CO (US)

(*) Notice: Subject to any disclaimer, the term of this patent is extended or adjusted under 35 U.S.C. 154(b) by 281 days.

This patent is subject to a terminal disclaimer.

(21) Appl. No.: 13/563,073

(22) Filed: Jul. 31, 2012

(65) Prior Publication Data

US 2012/0297376 A1  Nov. 22, 2012

Related U.S. Application Data (63) Continuation of application No. 11/319,919, filed on Dec. 27, 2005, now Pat. No. 8,234,638.

(60) Provisional application No. 60/639,903, filed on Dec. 28, 2004.

(51) Int. Cl.
| | |
|---|---|
| *G06F 9/44* | (2006.01) |
| *G06F 9/445* | (2006.01) |
| *G06F 11/00* | (2006.01) |
| *G06F 21/54* | (2013.01) |
| *G06F 21/56* | (2013.01) |

(52) U.S. Cl.
CPC ........ *G06F 21/54* (2013.01); *G06F 2221/2101* (2013.01); *G06F 21/566* (2013.01)
USPC ........... 717/174; 717/127; 717/168; 717/178; 726/22; 726/25

(58) Field of Classification Search
CPC ............. G06F 8/60; G06F 8/61; G06F 21/54; G06F 21/566; G06F 2221/2101; H04L 63/14; H04L 63/1441; H04L 63/145
USPC ............... 717/127–129, 168–178; 726/22–25
See application file for complete search history.

(56) References Cited

U.S. PATENT DOCUMENTS

| | | | |
|---|---|---|---|
| 5,412,717 A | 5/1995 | Fischer | |
| 6,069,647 A | 5/2000 | Sullivan et al. | |

(Continued)

FOREIGN PATENT DOCUMENTS

KR  1020030059565  7/2003

OTHER PUBLICATIONS

Non-Final Rejection for U.S. Appl. No. 11/319,919 mailed Jun. 23, 2008.

(Continued)

*Primary Examiner* — Qing Chen
(74) *Attorney, Agent, or Firm* — Hamilton, DeSanctis & Cha LLP (57) ABSTRACT

Systems and methods for significantly disrupting both the execution and distribution capabilities of computer viruses across computer networks and devices are provided. According to one embodiment, a computer program is installed within a computer system in a locally unique form having altered semantics based on a diversity mechanism. Execution of the computer program will fail to perform as intended on the computer system unless the locally unique form of the computer program is first transformed into an executable form of the computer program having correct semantics using the diversity mechanism. Use of the diversity mechanism differentiates an execution or loading environment associated with the computer system from that of other computer systems by affecting operational behavior of computer programs attempting to execute on the computer system. Responsive to an attempted execution of the computer program, it is transformed into the executable form by a protected pre-execution process.

20 Claims, 7 Drawing Sheets

(56) References Cited

U.S. PATENT DOCUMENTS

| | | |
|---|---|---|
| 6,105,133 A | 8/2000 | Fielder et al. |
| 6,141,756 A | 10/2000 | Bright et al. |
| 6,192,512 B1 | 2/2001 | Chess |
| 6,401,210 B1 | 6/2002 | Templeton |
| 6,493,457 B1 | 12/2002 | Quackenbush et al. |
| 6,779,114 B1 | 8/2004 | Chow et al. |
| 6,804,780 B1 | 10/2004 | Touboul |
| 6,901,519 B1 | 5/2005 | Stewart et al. |
| 6,931,546 B1 | 8/2005 | Kouznetsov et al. |
| 7,203,833 B1 | 4/2007 | Abadi et al. |
| 7,236,610 B1 | 6/2007 | Luo et al. |
| 7,370,233 B1 | 5/2008 | Sobel et al. |
| 7,444,667 B2 | 10/2008 | Bulusu et al. |
| 7,444,677 B2 | 10/2008 | Marr |
| 7,698,713 B2 | 4/2010 | Erlingsson |
| 7,752,446 B2 | 7/2010 | Agrawal et al. |
| 7,761,917 B1 | 7/2010 | Kumar |
| 7,958,554 B2 | 6/2011 | Chow et al. |
| 8,104,085 B2 | 1/2012 | Fresko et al. |
| 8,234,638 B2 | 7/2012 | Bird |
| 2003/0182435 A1 | 9/2003 | Redlich et al. |
| 2003/0221121 A1 | 11/2003 | Chow et al. |
| 2004/0117620 A1 | 6/2004 | Rothrock |
| 2004/0123136 A1 | 6/2004 | Jung |
| 2004/0268322 A1 | 12/2004 | Chow et al. |
| 2007/0022414 A1 | 1/2007 | Bird |
| 2007/0294769 A1 | 12/2007 | Bird |

OTHER PUBLICATIONS

Final Rejection for U.S. Appl. No. 11/319,919 mailed Apr. 6, 2009.
Final Rejection for U.S. Appl. No. 11/319,919 mailed Aug. 19, 2009.
Non-Final Rejection for U.S. Appl. No. 11/319,919 mailed Dec. 8, 2011.
Notice of Allowance for U.S. Appl. No. 11/319,919 mailed Jun. 25, 2012.

CREATING A RELATIVELY UNIQUE ENVIRONMENT FOR COMPUTING PLATFORMS

CROSS-REFERENCE TO RELATED APPLICATIONS

This application is a continuation of U.S. patent application Ser. No. 11/319,919 filed Dec. 27, 2005, now U.S. Pat. No. 8,234,638, which claims the benefit of U.S. Provisional Application No. 60/639,903, filed Dec. 28, 2004, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2004-2012, Hercules Software LLC.

BACKGROUND

1. Field

Embodiments of the present invention generally relate to systems and methods for eliminating the destructive and distribution capabilities of computer viruses across modern computer networks and more specifically to creating semi-unique computing platforms which are generally resistant to malicious computer programs (collectively referred to as malware).

2. Description of the Related Art

One benefit of standardization within any manufacturing domain is the regularity and commonality that makes product development more cost efficient. For example, the "learning curve" for design techniques can be amortized across a number of products and product releases, thus reducing the overall development cost. Manufacturing efficiencies may also be achieved. For example, common parts and/or components may be used for construction. This commonality allows the manufacturing to be organized in such a fashion as to exploit at common infrastructure as well as purchases of the common elements in volume which may also reduce the overall system cost. Furthermore when a standard is adopted, the end-users of a standardized product line may become productive more quickly. One reason is the "learning curve" for product usage is reduced since the end-users may already be familiar with a given model or a previous version which is substantially similar.

In addition to benefits in development and usage, another benefit to standardization exists in maintenance across product lines. One reason is that the maintenance of standardized product lines becomes easier since there is a common, standard model for the range of products. Although the discussion above is most obviously relevant to physical manufacturing, it is absolutely true that all of these points are also applicable to the development of computing systems, both hardware and software.

Unfortunately, there are several problems that may occur with standardization in both physical manufacturing and computing applications. One problem with standardization has to do with defects. If the standard model used for manufacturing has a defect, then all of the reproduced instances of the model will share the common defect. This is especially problematic in ubiquitous software environments. When a security defect becomes public knowledge, then hackers may exploit the vulnerability across system instances which have not had the defect repaired.

The use of a standard operating environment across the millions of machines in use today has created a computational mono-culture. By definition, a program which works on one instance of a standard computer environment will work on any instance of that environment. Although a computational mono-culture is generally highly beneficial, it creates opportunities for the development and distribution of malicious programs.

Computer viruses exploit the computational mono-culture in two ways: (1) publicly revealed security breaches are likely to be uncorrected in a large percentage of machines built to exploit the breach will probably run unchanged on a large number (millions) of machines with the same installed software. Once a computer virus gets past the security perimeter of the victim machine, the payload (a program) may divert the victim machine to the virus writer's intentions. For example, the victim machine may be used for the malicious destruction of information (vandalism), identity theft, espionage (e.g., theft of intellectual property), use of the victim computer as a zombie, for use in distributing spam, or to participate in a coordinated distributed denial of service (DDOS) attack.

The effort to develop and distribute a computer virus is facilitated by the computational mono-culture that currently exists. Although the effort to build a single virus instance (which can bypass existing security capabilities) may be high, the effort is rewarded because the virus can propagate across the mono-culture. This is one of the inherent problems of standardization of computer platforms.

In addition to the problem of standardization of computer platforms, a social engineering aspect of computer security exists which cannot be solved simply through technical means. For example, individuals can be deceived by an attacker to reveal information which might permit a hacker to breach a security perimeter for a collection of machines. When such a breach is achieved upon the given machine, the payload may propagate across other machines which share a common network with the breached machine.

Current anti-virus software has provided one possible solution to protecting computers from attacks. However, one problem with the current anti-virus software is the problem of trying to detect malicious patterns in programs from the range of possible patterns found within all programs. Most anti-virus programs are inherently reactive, since a pattern is only known about after an infection has been established, recorded and analyzed. In addition, the failure of anti-virus systems may be expensive. Hence, the current limitations of existing anti-virus software with their system of updates of virus pattern sets, the computational overhead of continually scanning the computer to search for malicious patterns, and the expense of failure are significant limitations in the protection of computer systems.

Since no anti-virus system is perfect, especially given the "social engineering" gateway to infection, a need exists for a mechanism to substantially reduce the risks inherent in the current computational mono-culture, without sacrificing the benefits of standardization.

SUMMARY

Systems and methods are described for significantly disrupting both the execution and distribution capabilities of computer viruses across computer networks and devices. According to one embodiment, a computer program is installed within a computer system in a locally unique form having altered semantics based on a diversity mechanism. Execution of the locally unique form of the computer program will fail to perform as intended on the computer system unless the locally unique form of the computer program is first transformed into an executable form of the computer program having correct semantics using the diversity mechanism. Use of the diversity mechanism differentiates an execution or loading environment associated with the computer system from that of other computer systems by affecting operational behavior of computer programs attempting to execute on the computer system. Responsive to an attempted execution of the computer program, the computer program is transformed from the locally unique form into the executable form using the diversity mechanism by causing a protected pre-execution process to be applied to the computer program.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Embodiments of the present invention generally relate to systems and methods for eliminating the distribution capabilities of computer viruses across computer networks and devices. According to one embodiment of the present invention, a "relatively" unique element for each individual computing environment is associated with a characteristic of a specific program into each executable program within that computing environment. For example, a relatively unique element may be embedded within a registered executable program, appended to the program, or otherwise associated with registered executable program, such as through a database or the like. Subsequently, the relatively unique element and the program characteristic are validated by a system linker/loader, or other protected pre-execution process, for example, before a program is allowed to execute. In one embodiment, the program is allowed to execute unfettered only if the pre-execution process indicates the validity of the program attempting to execute.

According to one or more embodiments, a microprocessor and/or an instruction decode unit may be a protected hardware device. In one embodiment, the instruction decode unit may be adapted to change the opcodes of the computer's instruction set, or the register assignment, or both. Accordingly, the tables and decoding logic used to specify the opcode mappings may become a part of the physical hardware of the machine. In some embodiments, the transformation function could take into account the position of the instruction within an aligned block of code. Although this may appear, at first glance, an expensive operation, it is far less complicated than the instruction transformations in current machines.

Traditional loaders typically allocate program memory for a new program (stack, code and heap space), and may protect these memory regions in certain ways (i.e., a code block of storage may have its access mode changed to READ-ONLY to prevent its modification by executing programs). In addition, traditional linkers typically connect the executing program with system library routines (I/O, storage allocation). In one embodiment, the linker/loader may be a protected process. In some embodiments, the linker/loader is part of the operating system kernel and must be run to process/transform the program to be executed.

Although encryption is one form of defining a unique element in a computing environment, there are many simpler algorithms, with faster execution times, which accomplish the task outlined herein. In a general sense, any reversible transformation may be considered an encryption. Therefore, even swapping instructions in a sequence could be defined as an encryption algorithm. According to one embodiment, a unique environment may be created by using encryption keys. For example by using distinct encryption keys for each computing system. In another embodiment, different transformation algorithms may be applied to different portions of a program. For example, one transformation may be applied to the data segment of a program and another transformation may be applied to the code segment. Further, different transformations may be applied to registers and other program constants. In either case, the encryption or transformation may be created using hardware components, software components, or a combination of the two.

In one embodiment, the diversity mechanism may be integrated into the virtual memory structure of a computer system. On most computers, there is a mapping from the virtual to the physical memory space which allows the computer's operating system to move a program's data so as to not be constrained to have said memory be contiguous in the physical address space of the computer. The diversity mechanism for the computer could permit the operating system to specify an additional mapping function during the fetch of the physical memory system. The implementation of this model of diversity mechanism could be in a tabular form, or it could be a logic function applied to a memory address in advance of the physical program access. One form of this mapping could be to "shuffle" the memory reference according to some total function; for example, a program's request for memory location N would actually be retrieved from location 3*N+M (modulo the size of the block to which this transform is applied). The remapping could be applied to the code memory for a program, the data memory of the program or both. Different remappings could be applied to the code memory than to the program memory; doing this would have the beneficial effect of disrupting the operation of malware introduced using BUFFER OVERFLOW intrusion techniques. The memory diversity mechanism could be applied at the page level of a computer, or any sub-level with a computers memory address space. For example, if the physical page size of the computer is 512 bytes, the memory diversity might apply to blocks of any power of two smaller than the page size (i.e., 4, 8, 16, 32, 64, 128, 256 bytes).

According to some embodiments, when a program performs a data fetch, an encryption method, such as a shuffling algorithm, may be applied. This may be done in hardware, software, or in a combination of the two.

Before a program can execute, it is integrated into the current operational environment of the computer upon which it will run. This generally includes rewriting constant displacements for memory addresses, such as, but not limited to branch/subroutine references to operating system (shared) library routines, local "relocation" addresses (for locally defined functions), globally accessible data and/or any combination thereof.

The location of these elements (data and functions) are likely to be different on different machine instances, and even at different times on the same computer due to the stochastic positioning of programs and data during computer operations. In accordance with various embodiments, some locations on a computer might be permanently fixed, such as fixed OS library locations for input/output (I/O).

In any event, the linker/loader is generally responsible for finding all locations in the (about-to-be-executed) program which reference relocatable program elements (data or instruction) and filling those locations with the specific element address.

According to another embodiment, a unique execution environment may be created by using a registration program to transform executable programs into a locally unique form. The reverse transformation program may be integrated into the system linker/loader and may be subsequently used prior to execution to transform the locally unique form of the registered program into one which will correctly execute on the given (standard) architecture.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a system linker/loader checking a program before allowing it to execute, embodiments of the present invention are equally applicable to various other pre-execution processes, specifically, these capabilities can be applied to interpreted systems prior to the interpretation of the program (or script). Similarly, while embodiments of the present invention are described in the context of virus elimination, the approach described herein is applicable to reducing piracy of software, enforcing program licenses, preventing inappropriate programs from being loaded and executed in a corporate environment, defining restricted security domains, and the like.

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types communication and computer devices and systems. More specifically, embodiments are applicable to communication systems, services, and devices such as cell phone networks, networks for mobile code (wherein programs may migrate across the network before, during and after execution) and compatible devices. In addition, embodiments are applicable to all levels of computing from portable or personal computers to large network mainframes and servers.

Terminology

Brief definitions of terms, abbreviations, and phrases used throughout this application are given below.

The term "code" is interchangeable with the term "instruction", and both refer to the organization and the opcode and register numbering for machine instructions which execute on the given, standardized computing platform.

The terms "connected" or "coupled" and related terms are used in an operational sense and are not necessarily limited to a direct physical connection or coupling.

The phrase "diversity mechanism" generally refers to a mechanism which provides a means to differentiate individual computing devices, with the goal of complicating the development and distribution of computer malware. According to one embodiment, the diversity mechanism has an effect upon the operational behavior of a program by affecting loading or execution, for example. If a program to be run upon a computer does not conform to the structure of the given computer, due to the diversity mechanism, then that program will not operate in correspondence to its intended behavior. Instead the program will almost certainly produce an immediate error in execution. In accordance with most embodiments, a diversity mechanism is enforced by a trusted and restricted (i.e., protected) component (hardware or software) of the computer. In some embodiments, a diversity mechanism is integrated into the operational framework of the computer so that any program to be executed must first pass through the diversity mechanism before being permitted to execute. For example, a diversity mechanism may be incorporated into the interface with the loader, within the instruction decoder, within the virtual memory structure of a computer system and/or the like. Also, according to various embodiments, a diversity mechanism might be applied at the beginning of program execution, or it could be applied continually during the course of program execution. In some cases, the diversity mechanism may be applied using hardware, software, or a combination thereof. For example, one embodiment of a diversity mechanism is a mechanism capable of encrypting a computer file, code, or set of instructions. Examples of diversity mechanisms include, but are not limited to, tickets and transformations, such as encryption. Furthermore, a diversity mechanism may refer to multiple encryption schemes and appropriate implementations employed at different stages and/or levels. In some embodiments, different encryption levels or schemes may be applied depending on the character of the information being encrypted, e.g., data, instruction set, trust level, and/or the like.

The term "encryption" generally refers the process of applying a reversible transformation to a set of information or data thus masking the information or data. In some embodiments, the encryption is cryptographically strong. In some embodiments, the encryption is not cryptographically strong, e.g., a shuffle algorithm.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "integrity indicator" generally refers to information associated with a program or library that may be used to confirm whether the original content at the time the integrity indicator is generated remains unchanged. According to one embodiment, a registration process generates and appends an integrity indicator to a program or library at the time of program installation. Subsequently, a pre-execution process, such as a system linker/loader verifies the appended integrity indicator prior to allowing the program to execute. In one embodiment, the integrity indicator may be a message digest, a checksum, hash, or a digital signature.

The phrase "linker/loader" generally refers to a mechanism implemented in software, firmware, hardware or a combination thereof for performing one or more of the following processes/functions: (i) resolving cross-references between separately compiled or assembled object modules; (ii) assigning final addresses to a single object module or set of object modules to create a single relocatable load module; (iii) copying executable programs from a storage device to main memory, where such executable programs can be executed; and (iv) replacing the placeholder address slots (e.g., virtual addresses) for operating system elements (functions and/or data) requested by an executable program being loaded into main memory with the physical addresses. According to one embodiment, the linker/loader is an operating system utility that performs traditional linker/loader functionality as well as performing authentication and integrity verification processing prior to allowing an executable program to run.

The phrases "locally unique form" and "local representation" generally refer to the form in which a program and/or libraries are encoded and stored for a particular local computing environment. In one embodiment, the locally unique form is based upon a "relatively" unique element associated with the particular computing environment. In one embodiment, the relatively unique element comprises a "diversity" mechanism incorporated into the system linker/loader which provides a security feature by preventing proper execution of executable programs that have not been properly transformed to accommodate the system linker/loader. In one embodiment, the locally unique form is created during a registration process which may be activated during program installation. The registration process may encode the program to place it in a form that is consistent with a local decoding process implemented within the system linker/loader prior to execution. In one embodiment, the locally unique form is created by resequencing the executable instructions, transforming the opcodes of the executable instructions or by adding a ticket to the program.

The term "malware" generally refers to programs which are installed onto a user's computer system without the user's knowledge or understanding, and which, when operational, perform operations which are destructive of information on the computer, and/or may utilize resources of the computer for purposes other than the intent of the computer owner. Examples of malware include, but are not limited to, viruses, spyware, trojans, adware and other malicious computer programs.

If the specification states a component or feature "may", "can", "could", or "might" be included or have a characteristic, that particular component or feature is not required to be included or have the characteristic.

The term "program" is interchangeable with the terms "subroutine", "function", "routine" or "module". In some contexts in this document, the term "code" may be a shorthand for a sequence of machine instructions which represent a "function", "subroutine" or "program". In various embodiments described in this document, a "program" may represent a collection of functions, subroutines or modules. Generally, however, these terms refer to any file that contains information that may be interpreted by a computer system as an executable program. Examples may include executable objects, file system objects, script files and/or the like. Furthermore, code objects, such as visual basic scripts, java scripts, Windows®-based scripts, java applets, and/or the like, are intended to be encompassed by the phrases "program," "subroutine," "function," "routine," and "module." Common file extensions of executable objects include, but are not limited to, .exe, .com, .sys, .dll, .scr, .cpl, .api, .drv, .bpl and/or the like. File system objects include objects like device drivers, network interfaces, and/or the like. Other examples of "programs," "subroutines," "functions," "routines," and "modules." may include files using the IEEE-695 standard, S-records, PEF/CFM Mach-O (NeXT, Mac OS X), a.out (Unix/Linux), COFF (Unix/Linux), ECOFF (Mips), XCOFF (AIX), ELF (Unix/Linux), Mach-O (NeXT, Mac OS X), Portable Executable, IBM 360 object format, NLM, OMF, SOM (HP), XBE (Xbox executable), and/or the like.

The term "responsive" includes completely or partially responsive.

The term "ticket" generally refers to a set of electronic credentials that verify the identity of an executable program, library, file, data segments, code and/or the like. For example, in some cases a method of generating and verifying a ticket comprises two complimentary algorithms. One for generating the authenticating mark, or credentials, and one for verifying the authenticating mark or credentials. In one embodiment, a cryptographically strong scheme such as a digital signature may be employed as the ticket. A digital signature or cryptographic digital signature denotes the result of computing a cryptographic hash value, such as SHA-1, SHA-256, MD-5, and the like, over a specific program or file, then encrypting the hash value using a private key. Given the same program or file, re-computing the hash value, and decrypting the digital signature using the corresponding public key, will produce the identical value if the encoded data remains the same. It is important to appreciate that the scheme need not be cryptographically strong to be effective in crippling the capabilities of malware. For example, any hash function or redundancy checker may be used. Examples of hash functions include, but need not be limited to, parity bits, check digits, longitudinal redundancy check, and any other check sum. Other types of redundancy checkers include cyclic redundancy check, horizontal redundancy check, vertical redundancy check, and the like. In one embodiment of the present invention, the presence of a ticket within an executable program operates as an access key allowing the executable program to be loaded and run by the computer system. Furthermore, during a registration process which is initiated responsive to installation of a program, an encrypted ticket may be embedded within the program, appended to the program, or otherwise associated with registered executable programs such as through a database, thereby allowing a linker/loader of a computer system to authenticate or otherwise verify the identity and legitimacy of the registered executable program when such registered executable program attempts to run within the computer system. According to one embodiment, tickets may be temporary and may expire or change on a periodic basis.

Computer System Overview

Figure 1:
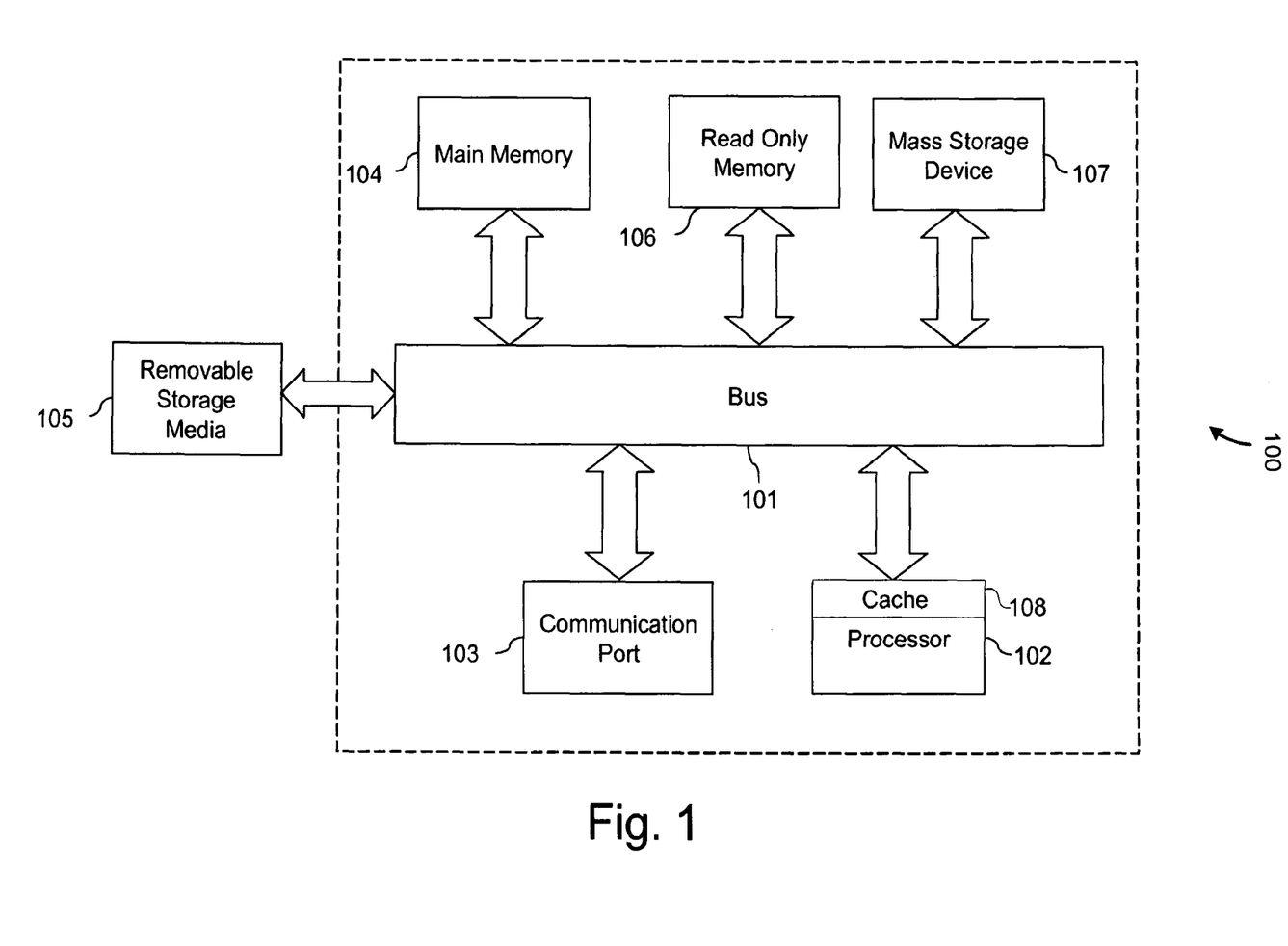
FIG. 1 illustrates an example of a computer system with which embodiments of the present invention may be utilized.

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 1 is an example of a computer system 100 with which embodiments of the present invention may be utilized. According to the present example, the computer system includes at least one processor 102, at least one communication port 103, a main memory 104, a read only memory 106, a mass storage 107, a bus 101, and a removable storage media 105.

Most modern processors implement a main memory addressing scheme called Virtual Memory that separates the logical and physical locations of data and programs in a memory system. For purposes of explanation and presentation, the exact characteristics of such an implementation are transparent to the operation of embodiments of the present invention.

Therefore, as is consistent with the operation of computing systems, all programs are (logically) moved from mass storage 107, the read-only memory 106, or some other location into a memory unit for the computer (either the main memory 104, or a read-only memory 106) immediately prior to execution by the processor 102. Elements of a program under execution might be held in a local cache memory 108 contained within the processor.

Processor(s) 102 can be any known processor, such as, but not limited to, an Intel® Pentium, Intel® Itanium® or Itanium 2® processor(s), or AMD® Opteron® or Athlon MP® processor(s), IBM® or Motorola® lines of processors. Communication port(s) 103 can be any of an RS-232 port for use with a modem based dialup connection, a 10/100 Ethernet port, or a Gigabit port using copper or fiber. Communication port(s) 103 may be chosen depending on a network such a Local Area Network (LAN), Wide Area Network (WAN), or any network to which the computer system 100 connects.

Main memory 104 can be Random Access Memory (RAM), or any other dynamic storage device(s) commonly known in the art. Read only memory 106 can be any static storage device(s) such as Programmable Read Only Memory (PROM) chips for storing static information such as instructions for processor 102.

Mass storage 107 can be used to store information and instructions. For example, hard disks such as the Adaptec® family of SCSI drives, an optical disc, an array of disks such as RAID, such as the Adaptec family of RAID drives, or any other mass storage devices may be used.

Bus 101 communicatively couples processor(s) 102 with the other memory, storage and communication blocks. Bus 101 can be a PCI/PCI-X or SCSI based system bus depending on the storage devices used.

Removable storage media 105 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

A Simplified Introduction to Computer Instruction Formats

Computers use a binary representation of numbers for both data and instructions. Furthermore, computer memory is organized as an ordered collection of numbers. Instructions of a computer are organized as fields which are usually partitioned into operations and their parameters. Generally, the field used to specify the numeric value for the operation is an opcode. Parameters may specify a limited range of high speed storage locations (called registers), or may be constant values (which may used for memory reference operations, or as elements of arithmetic operations).

EXAMPLE

Load $R_1$, 300 ($R_{12}$)
Add $R_3$, $R_2$, $R_5$
Branch Cond, 20 ($R_8$)

In the above example, the first instruction will take the number held in register 12, add 300 to it, find that storage location in the computer's memory, retrieve the number found therein, and save that number in register 1. The second instruction will take the number in register 5, add it to the number in register 2, and save the result in register 3. The third instruction will determine if the status of the preceding arithmetic (or relational) operation matches the condition COND. If not, program flow will proceed to execute the next instruction in sequence. Otherwise, program flow branches and continues with the location specified by the value in register 8 plus 20 by fetching instructions at that location.

Assume that the opcode value for a Load is 1, that of an Add is 2 and a Branch is 3. Then the above three instructions would have a numeric form of:

| Opcode | Field 1 | Field 2 | Field 3 |
|--------|---------|---------|---------|
| 1      | 1       | 300     | 12      |
| 2      | 3       | 2       | 5       |
| 3      | XXX     | 20      | 8       |

We have ignored the numeric value of the COND field in the third instruction and characterize it in the above table with the symbols "XXX".

The Role of the Linker/Loader in Program Execution

Before a program can execute, it must be integrated into the current operational environment of the computer upon which it will run. This generally includes rewriting constant displacements for memory addresses, branch/subroutine references to library routines, local "relocation" addresses and globally accessible data. Collectively, these set of locations, which must be rewritten with valid memory addresses before program execution, are called address constants or "Adcons."

The locations of these data and functions are likely to be different on different machine instances, and even at different times on the same computer due to the stochastic positioning of programs and data during computer operations. Some locations on a computer might be permanently fixed, such as fixed library locations for input/output (I/O) functions.

The linker/loader is responsible for finding all locations in the (about-to-be-executed) program which reference relocatable program elements (data or instruction) and filling those locations with the specific element address.

EXAMPLE

| Module A | | Module B | |
|---|---|---|---|
| { | | { | |
| | external | | global x; |
| | local y; | | local w; |
| | y = x + 4 | | x = 45 |
| } | | } | |
| load | r2,=loc(x) | load | r1,=45 |
| add | r2,=4 | store | r1,=loc(x) |
| store | r2, 8(base) | | |

In the above program schema, the variable "X" is assigned to an "arbitrary" memory location during the loading phase of Module B. Any programmatic reference to X (characterized by an associated Adcon) must be written during module A and B's loading process, before the correct execution of the above program is possible. Therefore, the first instruction of Module A, and the last instruction of Module B contain Adcon references to the variable "X" which must be "filled-in" or resolved prior to the correct execution of this program.

Execution Environment Overview

In one embodiment, an execution environment is created which makes each distinct computer appear unique to any incoming virus. Although absolute security of a computing environment is desirable, it is generally an unattainable goal. However, if a networked computing environment connects a large number of "relatively" unique machines, viruses (and other malware) will have significant difficulty infecting and propagating across even a small subset of attached machines. The absolute uniqueness of the element for a computer is not essential. Absolute security of a computer system is not technically feasible, and is certainly not justified given its cost. Recall that a principle goal is to reduce the computational mono-culture of computers. Even if the number of distinct forms of computers is small (ten thousand, one thousand, even one hundred), then the penetration capability and automatic distribution capability of a computer malware is significantly degraded. This will have impact upon the cost/benefit value of the construction of said malware by a virus author. To this end a "substantially" unique environment is created by providing a "gate" which intercepts programs before execution and checks that they are valid for operation within the unique environment of the given machine.

While according to various embodiments, a registration process transforms executable programs and/or libraries into a locally unique form during installation and a computer system's linker/loader subsequently validates programs prior to executing them permitting only valid programs to execute, the creation of computational diversity while preserving standardization may be achieved in various other ways. For example, executable programs may be delivered in their own unique forms prior to installation, delivered with an application-specific loader and/or a different pre-execution process may perform the program validation.

According to some embodiments, the installation process may require some type of validation or verification process. In some embodiments, an administrator or end user responsible for the machine may be responsible for the validity of a program before it is permitted to be registered. Various techniques known to those skilled in the art may be used to verify the program, e.g., sandboxing. In a corporate environment, a sysAdmin, such as a network manager or IT specialist, may be responsible for the machines. For home computers, the administrator might be the owner.

In other embodiments, a subscription service may be used to verify the software program. Other techniques such as white-listing, black-listing, and/or the like may be used to validate the program. Still yet, according to one embodiment, there may be multiple protection domains specified by differing tickets in a given system. For example, a ticket may provide a variety of trust levels, e.g., completely trusted, highly trusted, medium trust, low trust, and not trusted. As such, access to system resources and ability of the program may be appropriately limited. Furthermore, a variety of reverse transformations may be used by the loader/linker may be used for different program domains. For example, a program distributed from a subscription service might be use a different decryption key than a program which was permitted to be installed by an end user.

Use of Integrity Indicators and Tickets

One embodiment uses an integrity indicator, such as a checksum, and a ticket. The ticket may be changed periodically or responsive to predetermined internal or external events. In accordance with one embodiment, each "valid" program is registered with the system during installation of the program.

Figure 2:
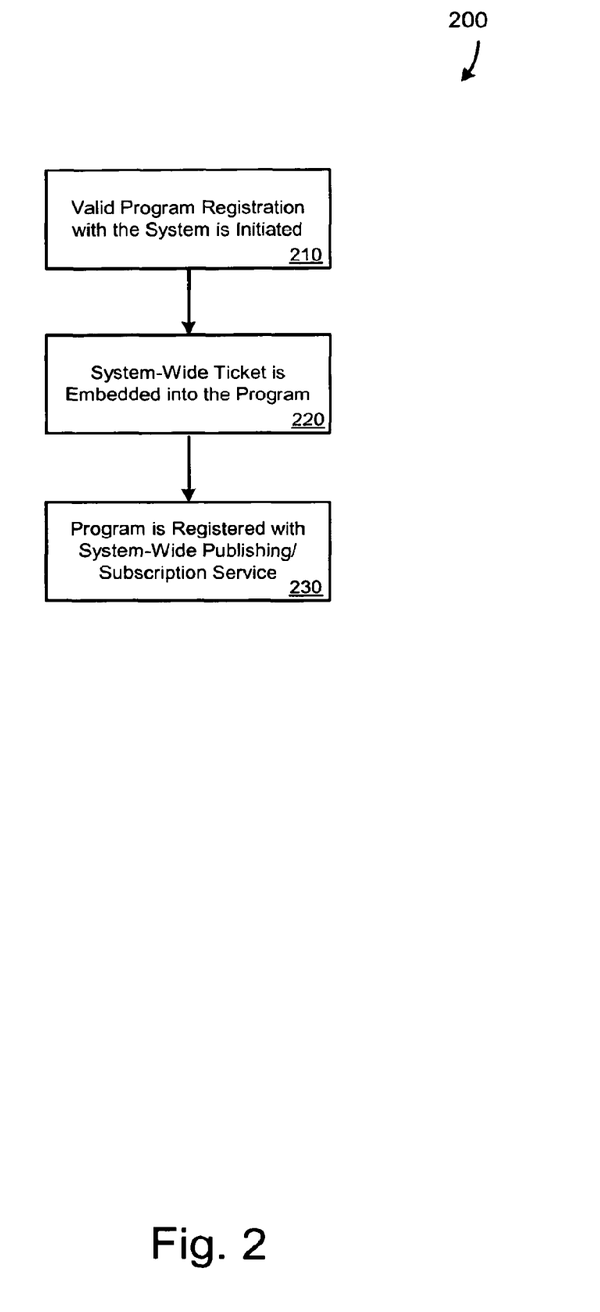
FIG. 2 is a flow chart of an exemplary valid program registration in accordance with one embodiment of the present invention.

A program registration process in accordance with one embodiment of the present invention is illustrated in FIG. 2. According to the present example, the registration process causes at least two actions to occur. At block 220, when a valid program registration is initiated with the system at block 210, a system-unique ticket is embedded into each program along with a characteristic of or metadata associated with the specific program (such as a checksum or a hash of the program). Then, the program is registered with a system-wide publish/subscribe information distribution system at block 230.

Figure 3:
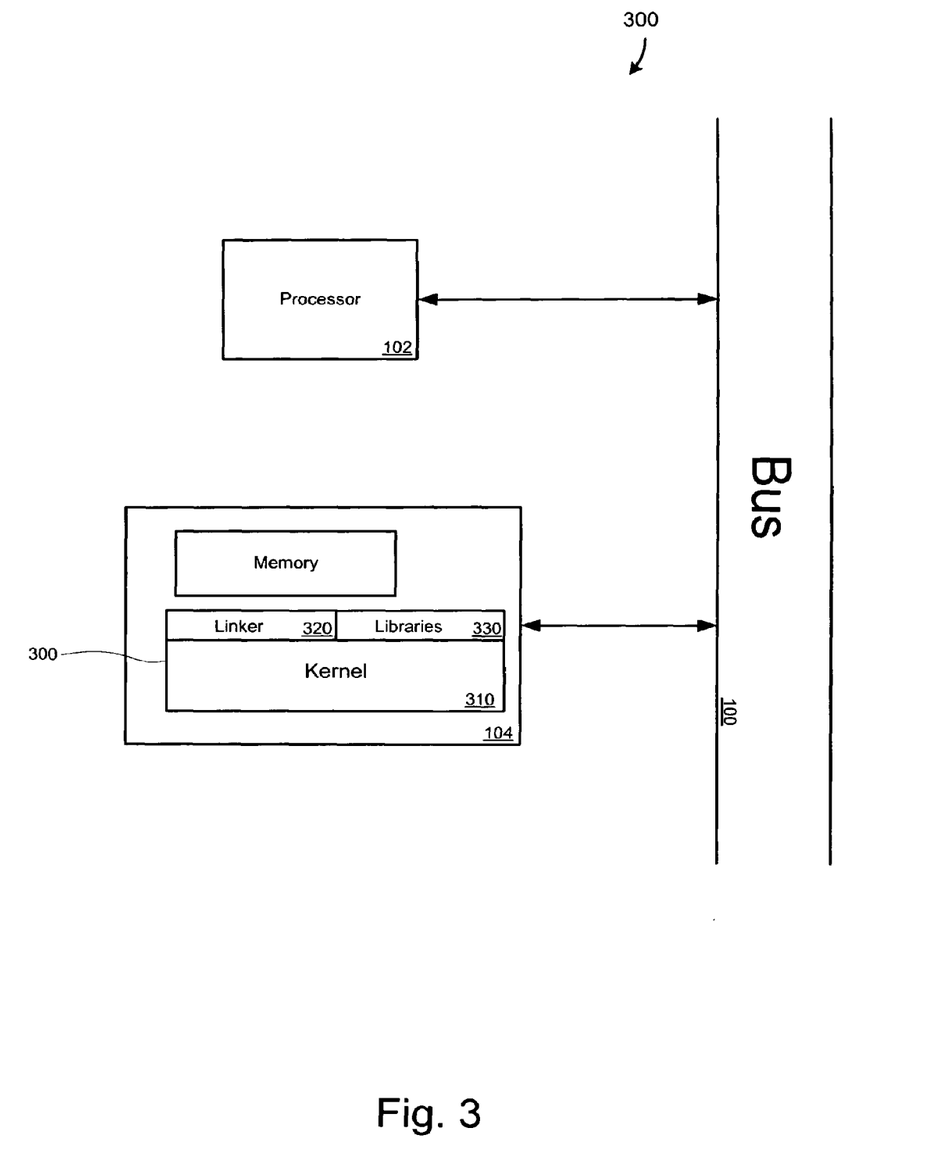
FIG. 3 represents an exemplary high level logical diagram of the placement of the system linker/loader in relation to various components of a computer system with which embodiments of the present invention may be utilized.

FIG. 3 conceptually illustrates the placement of the linker/loader 320 in an operating system 300. The operating system is also a program, albeit a special one which manages all of the resources for a computer system 100. A program may be stored in main memory 104, Read Only Memory 106, or other storage devices. In the present example, the linker/loader 320 is a component of the operating system which also includes system libraries 330, which provide an interface to the operating system kernel 310, which alone may directly reference physical elements of the computer system 100 (such as the system bus 101, I/O ports 103, mass storage 107, etc.). When a program is activated for execution, it must first pass through the linker/loader which binds the program to the specific resources available through the operating system 300, most often through the system libraries 330. Once bound to the given computer, the program can be executed on the computer system's processor 102.

Figure 4:
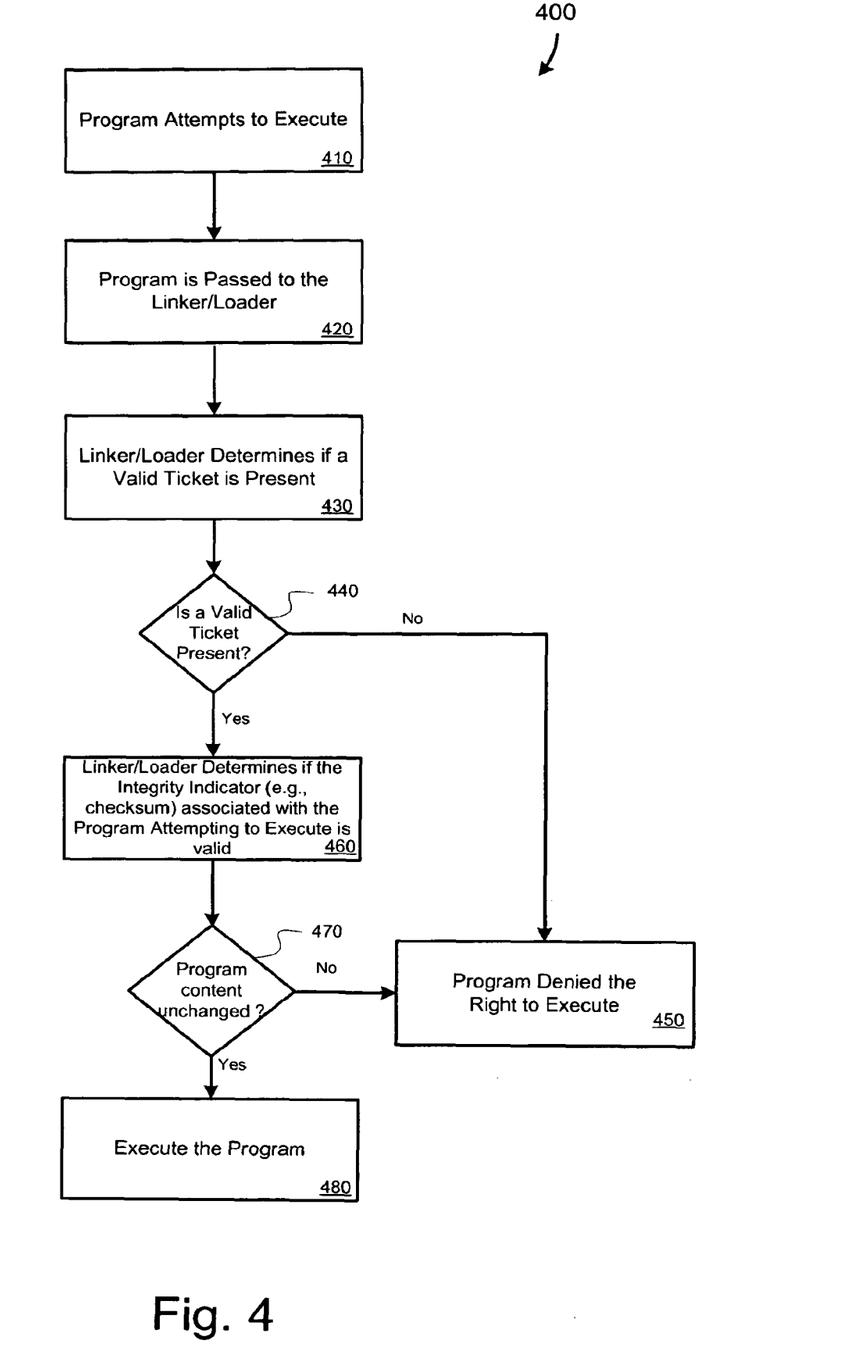
FIG. 4 is a flow chart representing a program validation process in accordance with one embodiment of the present invention.

FIG. 4 is a flow diagram illustrating a program validation process in accordance with one embodiment of the present invention. In the present example, when a program attempts to execute (block 410) it is passed to the linker/loader at block 420. The linker/loader determines if the program has the right to execute. To make this determination, the linker/loader checks at block 430 to see if a valid ticket is present. For example, in some embodiments, a ticket may be embedded, pre-pended, or located in a secure database. If a valid ticket is not present, the program is denied the right to execute at block 440. Otherwise, the linker/loader performs its standard pre-execution operations on the program (such as allocating necessary storage, rewriting address constants, etc) at block 450. In addition, at block 450 the linker/loader computes the current platform unique integrity indicator for the program by using an appropriate cipher algorithm such as checksum, hash function, etc. At block 450, the linker/loader may verify if the computed integrity indicator matches the indicator pre-pended to, embedded within, or otherwise associated with the program to be executed. The two values are compared in block 460, and if they do not match, then the program is denied the right to execute in block 440. Otherwise, the program is granted the right to execute in block 470, and is added to the collection of valid programs maintained by the operating system.

Figure 5:
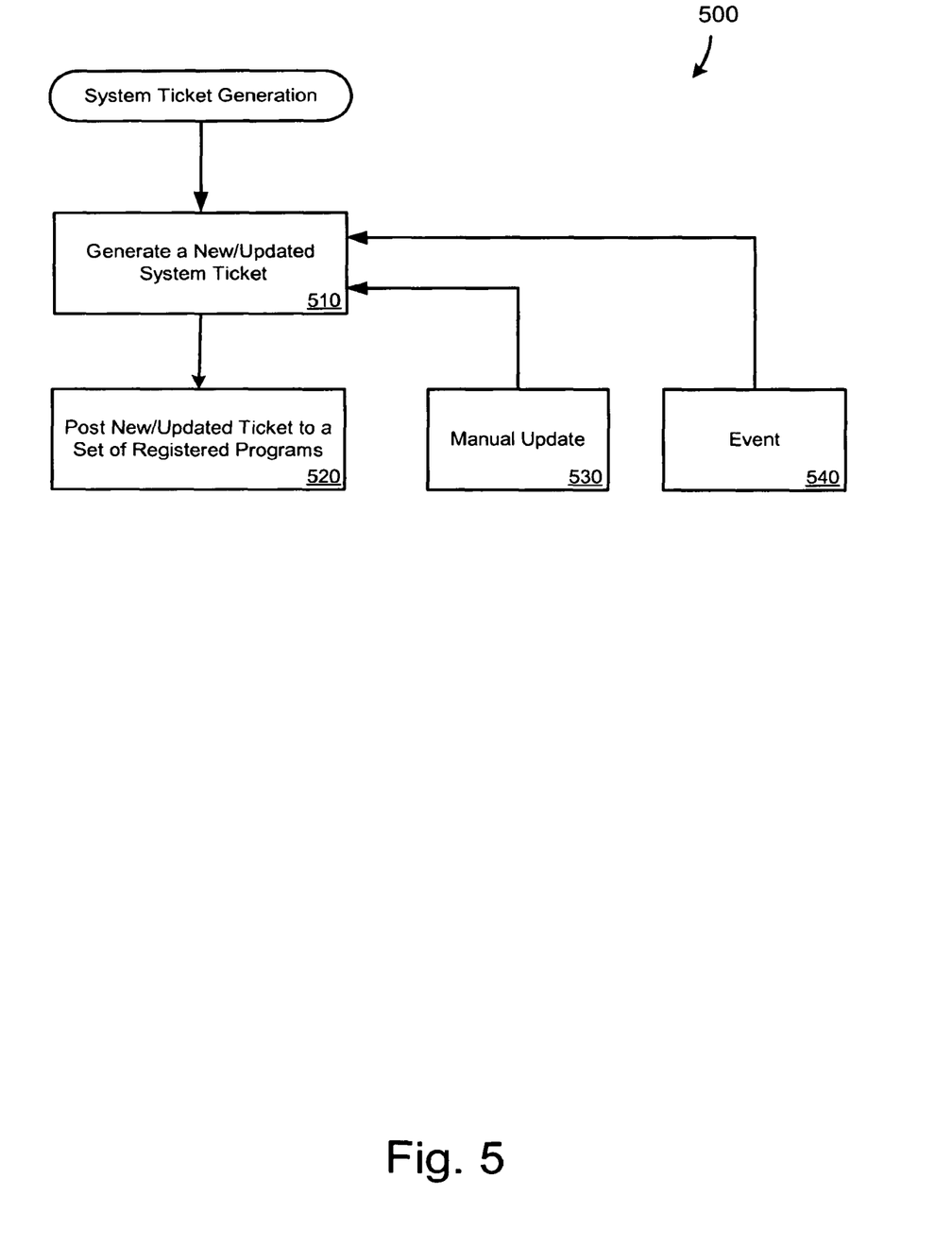
FIG. 5 is a flow chart representing a method for generating a new or updated system ticket in accordance with one embodiment of the present invention.

According to one embodiment, in order to reduce the probability of a misuse of the ticket, the system ticket or unique element of the diversity mechanism may be changed on a regular basis. A high level flow diagram illustrating a method of generating a new or updated system ticket in accordance with one embodiment of the present invention is presented in FIG. 5. In accordance with one embodiment, the ticket comprises a value defined, or generated, by the program registration system at block 510. According to one embodiment, registration system 510 may combine a characteristic of the given program and a system-unique characteristic to form a ticket. Then, at block 520, the program and its ticket may be committed to the computer systems' mass storage 107. According to some embodiments, additional protection may be provided by regenerating the program's ticket. In one embodiment, the regeneration may be performed as a result of an exogenous input or request from a system administrator 530. In another embodiment, the ticket may be changed or updated at a predetermined time or date, or on a periodic basis, as illustrated in block 540. For example, the ticket may be changed on a periodic basis such as, but not limited to, per day, per hour, per minute, and/or any combination thereof. The ticket may also be changed based on entries in a pre-defined table or at random. In any event, a new ticket may be created and posted to the set of registered programs. In this way, the "execution gateway" may be constantly transformed or mutated.

Even if the algorithm which implements the integrity indicator is known, and even if a system-wide ticket is found by a virus writer, there is only a very small "window of opportunity" during which a virus payload might be loaded onto the computer with a chance of successfully getting past the checking algorithm (FIG. 4) within the system linker/loader.

Shuffling the Execution Body of the Program

Figure 6:
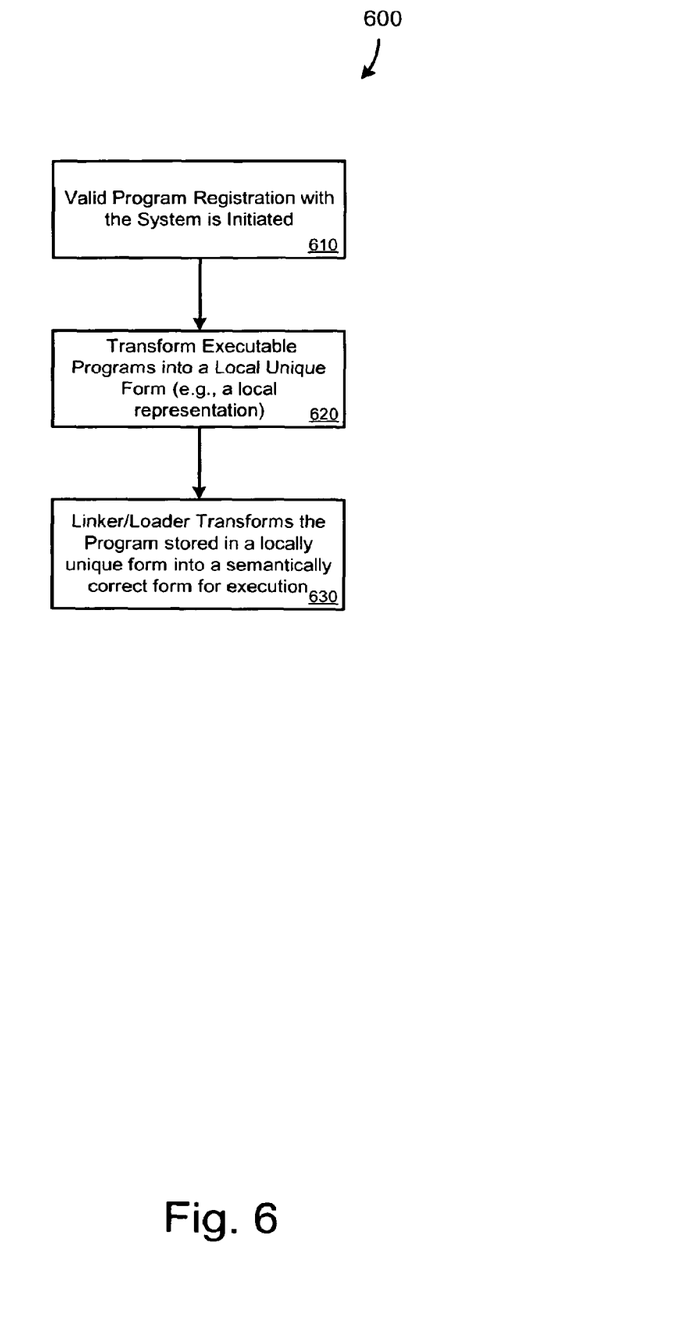
FIG. 6 is a high level flow chart illustrating a method of transforming executable code and libraries into a locally unique form in accordance with one embodiment of the present invention.

FIG. 6 is a high level flow diagram illustrating a method of transforming executable code and libraries into a locally unique form in accordance with one embodiment of the present invention. In the present example, a valid program registration with the system is initiated at block 610.

At block 620, a unique execution environment is created responsive to the program registration. For example, a registration program may transform the executable program into a locally unique form. Various transformations may be used. For example, the executable instructions of the program may be reordered and/or the opcodes of the instructions may be transformed.

At block 630, when the program later attempts to execute, the system linker/loader or some other pre-execution process is used to transform the program stored in the locally unique form into a standard executable form that will correctly execute on the given (standard) architecture.

Figure 7:
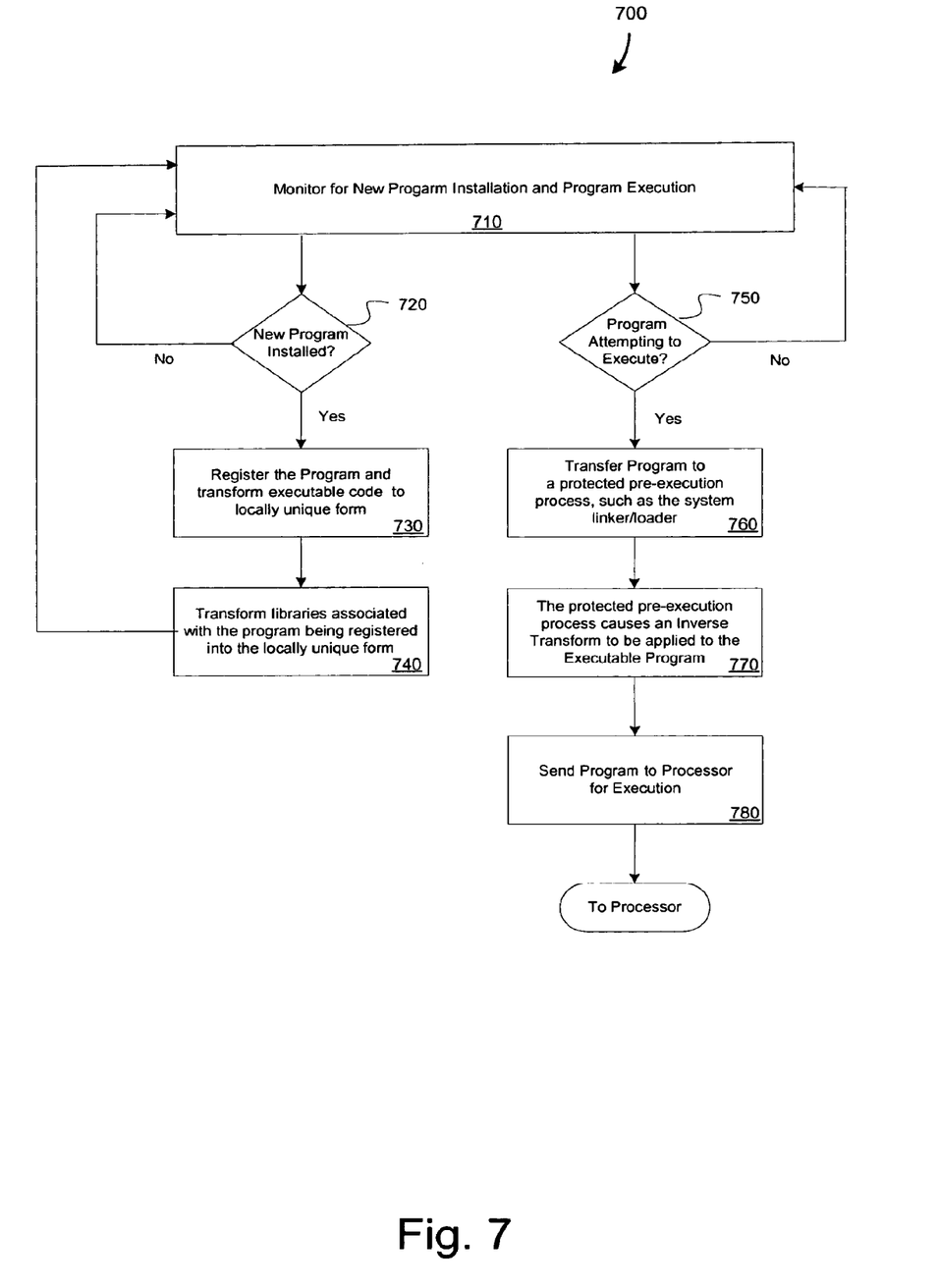
FIG. 7 represents a detailed flow chart representing a monitoring process in accordance with one embodiment of the present invention.

FIG. 7 is a detailed flow diagram representing a monitoring process in accordance with one embodiment of the present invention. According to the present example, the system continuously monitors for the installation of new programs or attempted program execution at block 710.

If the system determines a new program is being installed at block 720, the program is registered at block 730. In accordance with one embodiment, the instructions of the program are reordered in a sequence which is unique to the given machine. Then, all "valid" applications and libraries associated with the program being installed are registered and resequenced in the "shuffled" mode which is specified for the machine at block 740. In one embodiment, all "safe/valid" programs are shuffled during the registration process using a shuffle mode that might employ a machine centric template, with an initial sequence offset based upon some characteristic of the "raw" program (modulo a unique element of the given machine). When the system determines a program is attempting to execute at block 750, then the program and its libraries are transferred to the linker/loader at block 760. Then, at Load/Link time, the incoming program and its libraries (stored in a locally unique form) are transformed into a standard, executable form utilizing the inverse machine centric sequence map at block 770. At block 780, the resultant "standard-form" program is sent to the processor for execution. In the present example, a modified linker/loader is involved in the start-of-execution process. According to other embodiments, this protection mechanism may involve an alternative program validation process (either before or during program execution).

One advantage of this type of underlying organization of a dispatch scheme for a given machine is that viruses which find their way onto the machine will not be properly registered, and therefore will likely fail to correctly start. Consequently, this should result in the denial of execution for failing to pass the pre-execution validation or a program execution exception, for example. As such, one advantages of this scheme is that it should cripple the exponential growth of the virus distribution network. Furthermore, by using various embodiments of this scheme, a "paper trail" for infection pathways is more likely to be created, facilitating the task of computer forensic analysis.

Although the shuffle key is best protected, even its loss to the outside world, or to an attacker, is not catastrophic to the network as a whole. Only the machine whose key is lost is immediately vulnerable, and then only for the window of opportunity before the key is changed. The effort of a virus writer to deliver his payload to a large number of "unique" machines becomes astronomical, since the virus writer must have access to the collective set of keys for machines he wishes to infect, and he must target his machine specific virus instance to the correct machine to enable its correct startup after the loading/linking process.

In addition to requiring the ability to steal the local shuffle template, the virus author would additionally need to bypass the existing network security framework to insert the payload onto the single machine with that given shuffle template. The required bi-directional activity for virus insertion will likely leave an incriminating "paper trail" for subsequent forensic investigations.

EXAMPLE OF A LOCALLY UNIQUE FORM

A simple exemplary transformation is now shown with a set of abstracted instructions. For this example, a simple generator function which iterates through the list using an odd number (modulo list size) is illustrated.

Consider the instruction sequence A, B, C, D . . . N. The shuffled sequence using a step constant of 3 would be:

| Shuffled Position | Execution Position | Instruction |
|---|---|---|
| 1 | 5 | E |
| 2 | 10 | J |
| 3 | 1 | A |
| 4 | 6 | F |
| 5 | 11 | K |
| 6 | 2 | B |
| 7 | 7 | G |
| 8 | 12 | L |
| 9 | 3 | C |
| 10 | 8 | H |
| 11 | 13 | M |
| 12 | 4 | D |
| 13 | 9 | I |
| 14 | 14 | N |

During loading, the Loader would fetch the first instruction from location 3 (instruction "A"), the next from location 6, etc. The algorithm for reconstructing the semantically correct operating sequence would be:

inst(i)=shuffled((i*Generator)modulo BlockSize)

In the above example, the generator value is "3", and the blockSize is "14". Thus, the instruction in the execution sequence position "10" can be found in the table at location (3*10)mod 14=30 mod 14=2.

Additional parameters can be added to the shuffle/resequence algorithm. For example, a starting offset into the block could be used:

inst (i)=shuffled (((i+offset)*G)modulo B)

In the above table, the offset is "0". However, the loader could use any offset up to the blockSize of the list. Using an offset like this is equivalent to "rotating" the shuffled table by a constant factor.

Although the technique outlined above defines a local environment for the specific machine, it makes the generation of automatic, self-perpetuating viruses almost intractable across a network, since each virus instance must be constructed to match the pattern for each specific machine. Even this simple algorithm may have a number of different parameters to greatly complicate defeating it. For example, a different constant factor could be used to offset the resequencing process, a different number (3, 5, 7, etc.) could be used for the generator, and the block size for each computer can be drawn from a number of possible block sizes, so long as the sequencing value is relatively prime with respect to the block size.

For any given blockSize, there are approximately blockSize/2+blockSize distinct local representations of the given program block, since you have (blockSize/2) possible odd numbers in the range (which can be used for the generators), and (blockSize) distinct offsets for retrieving generated values. In accordance with one embodiment, in order to increase the number of possible distinct local environments, programs may be broken into a collection of blocks each characterized by the triple: (generator, offset, blockSize).

If the local representation used multiple triples (T1, T2 . . . Tn), a program would be encoded using theses triples, then decoded using the above resequencing algorithm, employing the triple appropriate for the given block until the program stream was exhausted.

The above example is instructive for several reasons. The "diversity mechanism" for a given machine needn't be extremely complicated for the techniques described herein to have great value in inhibiting the effect and propagation of malware. To crack the diversity mechanism automatically, a virus would need to begin executing on the given platform. But, in order to begin executing, it would first need to pass through the linker/loader, or otherwise attach itself as a payload to a valid program. While exploiting a buffer overflow to begin execution is possible, the analytic routine required in that payload would need to be quite large to perform any significant analysis of the diversity mechanism for the given platform.

Better Protection

Various embodiments allow for protection to be achieved on a computer, especially in an environment where the generator/resequencing algorithm is vulnerable to attacks through social engineering. In accordance with various embodiments, the computer can be programmed to regularly regenerate its shuffle key. That is, it can regularly resequence binary program executables in its environment. This is an instance of the computer morphing its execution environment to inhibit viruses. In addition, the shuffling/decoding process can modify the instruction opcodes using a different sequencing algorithm.

In other another embodiment, the shuffling/decode process can modify registers and other program constants using a difference sequencing algorithm. The entire process can use templatized schema for representing common instruction sequences (such as the subroutine entry/exit sequence). The indices of these templatized schema can be substituted into the shuffled instruction stream.

Exemplary Applications

If the linking/loading process is an integral part of the operation of an application, then the application can only be viewed after loading/linking, and only in the memory of the target computer. In addition to providing security against arbitrary virus infection, embodiments of the strategy discussed above can be used in other ways to provide important capabilities to a computing environment. Examples include, but are not limited to, the following: 1) reduction of piracy of software by complicating the reverse engineering of an application; 2) enforcement of program licenses by shipping a loader with each application; 3) prevention of inappropriate programs from being loaded and executed in a corporate environment; 4) defining a restricted security domain.

In one embodiment designed for the enforcement of program licenses by shipping a loader with each application, the application specific loader integrates the license check algorithm into loading process on a per-application/platform basis.

In one embodiment designed to prevent inappropriate programs from being loaded and executed in a corporate environment, using a "shuffle" program resident only upon a corporate server prevents a user of a workstation in the corporate environment from converting their program into the corporation's locally unique form. This would limit the liability of a corporate enterprise by reducing the risk that an employee is running "pirate" software within the corporate environment.

In another embodiment designed to define multiple security domains, programs which are validated may be directly linked with any system service call they require, thus permitting high performance operation. Programs which are not validated are only linked with "safe" wrappers to vulnerable system service routines, and could be monitored during their program execution. Examples of vulnerable routines might include, but are not limited to, file I/O routines, network read/write routines, (Windows) system registry write operations, and the like.

In embodiments which define a restricted execution capability, an unregistered program might be allowed to execute, but it wouldn't be allowed to do anything which might disrupt the correct operation of the machine. Moreover, according to some embodiments, a rollback function may also be available. As such, if it was established that an unregistered program made undesirable system modifications, a rollback function, based upon the system's data backup facility, for example, could be invoked to return the system to its "pre-infected" state. The ability to provide this security feature is a direct effect of integrating a "diversity" mechanism into the system.

In another embodiment, a system log could be maintained which tracked the loading of unregistered program. Then, if undesirable program behavior was detected (either manually or automatically), such as excessive use of system resources, presentation of undesired pop-up windows, and the like, the end-user would be able to trace the behavior back to the program which initiated it.

In conclusion, embodiments of the present invention seek to provide novel systems, methods and arrangements for eliminating the operational and distribution capabilities of computer viruses and malware across modern computer networks and more specifically seek to provide semi-unique computing platforms. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
installing a computer program within a computer system in a locally unique form having altered semantics based on a diversity mechanism, wherein execution of the locally unique form of the computer program will fail to perform as intended on the computer system unless the locally unique form of the computer program is first transformed into an executable form of the computer program having correct semantics using the diversity mechanism, and wherein use of the diversity mechanism differentiates an execution environment or a loading environment associated with the computer system from that of other computer systems by affecting operational behavior of computer programs attempting to execute on the computer system; and
responsive to an attempted execution of the computer program, transforming the computer program from the locally unique form into the executable form using the diversity mechanism by causing a protected pre-execution process to be applied to the computer program.

2. The method of claim 1, further comprising, during said installing, registering, by a registration program of the computer system, the computer program for execution on the computer system by transforming the computer program from the executable form into the locally unique form based on the diversity mechanism.

3. The method of claim 1, further comprising, during said installing, registering, by a registration program resident on a separate server, the computer program for execution on the computer system by transforming the computer program from the executable form into the locally unique form based on the diversity mechanism.

4. The method of claim 1, wherein the computer program is delivered in the locally unique form with a corresponding application-specific loader representing the protected pre-execution process.

5. The method of claim 1, wherein the diversity mechanism involves resequencing of executable instructions of the computer program.

6. The method of claim 5, further comprising periodically resequencing the executable instructions of the computer program based on a different set of resequencing parameters.

7. The method of claim 5, wherein said resequencing is based on a computer system centric template, with an initial sequence offset based upon a characteristic of the computer program modulo a unique element of the computer system.

8. The method of claim 1, wherein the diversity mechanism involves transforming opcodes of executable instructions of the computer program.

9. The method of claim 1, wherein said transforming the computer program from the locally unique form into the executable form using the diversity mechanism occurs prior to execution of the computer program.

10. The method of claim 1, wherein said transforming the computer program from the locally unique form into the executable form using the diversity mechanism occurs throughout execution of the computer program.

11. The method of claim 1, wherein use of the diversity mechanism is for purposes of reducing exposure to malware.

12. The method of claim 1, wherein use of the diversity mechanism is for purposes of enforcing program licenses.

13. The method of claim 1, wherein use of the diversity mechanism is for purposes of preventing inappropriate programs from being loaded and executed in a corporate environment.

14. A non-transitory computer-readable storage medium tangibly embodying a set of instructions, which when executed by one or more processors of one or more computer systems, cause the one or more processors to perform a method comprising:
installing a computer program within a computer system of the one or more computer systems in a locally unique form having altered semantics based on a diversity mechanism, wherein execution of the locally unique form of the computer program will fail to perform as intended on the computer system unless the locally unique form of the computer program is first transformed into an executable form of the computer program having correct semantics using the diversity mechanism, and wherein use of the diversity mechanism differentiates an execution environment or a loading environment associated with the computer system from that of other computer systems by affecting operational behavior of computer programs attempting to execute on the computer system; and
responsive to an attempted execution of the computer program, transforming the computer program from the locally unique form into the executable form using the diversity mechanism by causing a protected pre-execution process to be applied to the computer program.

15. The non-transitory computer-readable storage medium of claim 14, wherein the method further comprises, during said installing, registering, by a registration program of the computer system, the computer program for execution on the computer system by transforming the computer program from the executable form into the locally unique form based on the diversity mechanism.

16. The non-transitory computer-readable storage medium of claim 14, wherein the method further comprises, during said installing, registering, by a registration program resident on a separate server of the one or more computer systems, the computer program for execution on the computer system by transforming the computer program from the executable form into the locally unique form based on the diversity mechanism.

17. The non-transitory computer-readable storage medium of claim 14, wherein the computer program is delivered in the locally unique form with a corresponding application-specific loader representing the protected pre-execution process.

18. The non-transitory computer-readable storage medium of claim 14, wherein the diversity mechanism involves resequencing of executable instructions of the computer program.

19. The non-transitory computer-readable storage medium of claim 14, wherein the diversity mechanism involves transforming opcodes of executable instructions of the computer program.

20. The non-transitory computer-readable storage medium of claim 14, wherein said transforming the computer program from the locally unique form into the executable form using the diversity mechanism occurs prior to execution of the computer program.

* * * * *